United States Patent
Battiste

(10) Patent No.: US 7,313,499 B2
(45) Date of Patent: Dec. 25, 2007

(54) APPARATUS FOR CHARACTERIZING THE TEMPORO-SPATIAL PROPERTIES OF A DYNAMIC FLUID FRONT AND METHOD THEREOF

(75) Inventor: Richard L. Battiste, Oak Ridge, TN (US)

(73) Assignee: UT-Battelle LLC, Oak Ridge, TN (US)

( * ) Notice: Subject to any disclaimer, the term of this patent is extended or adjusted under 35 U.S.C. 154(b) by 0 days.

(21) Appl. No.: 11/324,764

(22) Filed: Jan. 3, 2006

(65) Prior Publication Data

US 2007/0156371 A1 Jul. 5, 2007

(51) Int. Cl.
*G01K 3/12* (2006.01)

(52) U.S. Cl. .................. 702/130; 702/136; 700/197

(58) Field of Classification Search .................. None
See application file for complete search history.

(56) References Cited

U.S. PATENT DOCUMENTS

| | | | |
|---|---|---|---|
| 3,612,151 A * | 10/1971 | Harrington et al. | ......... 164/487 |
| 4,673,300 A | 6/1987 | Wilhelmson et al. | |
| 4,725,399 A | 2/1988 | McCulloch et al. | |
| 4,777,348 A | 10/1988 | Gellert | |
| 4,820,147 A | 4/1989 | Gellert | |
| 4,915,508 A | 4/1990 | McCulloch et al. | |
| 5,122,050 A * | 6/1992 | Gellert | ......... 425/549 |
| 5,148,594 A | 9/1992 | Gellert | |
| 5,238,391 A | 8/1993 | Teng | |
| 5,406,053 A | 4/1995 | Masreliez | |
| 5,677,484 A | 10/1997 | Stark | |
| 5,948,978 A | 9/1999 | Feller | |
| 6,104,011 A | 8/2000 | Juliano | |
| 6,338,271 B1 | 1/2002 | Stark | |
| 6,486,442 B2 | 11/2002 | Wheeler | |
| 6,670,582 B2 | 12/2003 | Rudent et al. | |
| 2002/0084543 A1 * | 7/2002 | Buja | ......... 264/40.4 |
| 2006/0082009 A1 * | 4/2006 | Quail et al. | ......... 264/40.1 |

FOREIGN PATENT DOCUMENTS

| | | |
|---|---|---|
| JP | 05164711 | 6/1993 |
| JP | 05245885 | 9/1993 |
| JP | 11023503 | 1/1999 |
| JP | 2000310604 | 11/2000 |

* cited by examiner

*Primary Examiner*—John Barlow
*Assistant Examiner*—Jonathan Moffat
(74) *Attorney, Agent, or Firm*—John Bruckner PC

(57) ABSTRACT

Methods and apparatus are described for characterizing the temporal-spatial properties of a dynamic fluid front within a mold space while the mold space is being filled with fluid. A method includes providing a mold defining a mold space and having one or more openings into the mold space; heating a plurality of temperature sensors that extend into the mold space; injecting a fluid into the mold space through the openings, the fluid experiencing a dynamic fluid front while filling the mold space with the fluid; and characterizing temporal-spatial properties of the dynamic fluid front by monitoring a temperature of each of the plurality of heated temperature sensors while the mold space is being filled with the fluid. An apparatus includes a mold defining a mold space; one or more openings for introducing a fluid into the mold space and filling the mold space with the fluid, the fluid experiencing a dynamic fluid front while filling the mold space; a plurality of heated temperature sensors extending into the mold space; and a computer coupled to the plurality of heated temperature sensors for characterizing the temporal-spatial properties of the dynamic fluid front.

6 Claims, 4 Drawing Sheets

APPARATUS FOR CHARACTERIZING THE TEMPORO-SPATIAL PROPERTIES OF A DYNAMIC FLUID FRONT AND METHOD THEREOF

STATEMENT AS TO RIGHTS TO INVENTIONS MADE UNDER FEDERALLY-SPONSORED RESEARCH OR DEVELOPMENT

This invention was made with United States Government support under prime contract No. DE-AC05-00OR22725 to UT-Battelle, L.L.C. awarded by the Department of Energy. The Government has certain rights in this invention.

BACKGROUND INFORMATION

1. Field of the Invention

Embodiments of the invention relate generally to the field of injection molding systems and to methods of using such systems. More particularly, an embodiment of the invention relates to a molding apparatus coupled to a characterization computer and to methods of characterizing a fluid within the mold space of a molding apparatus.

2. Discussion of the Related Art

Prior art molding or casting systems are known to those skilled in the art. For instance, a conventional injection molding system injects fluid into a mold space through several openings, thereby filling the mold space with the fluid, which solidifies to the shape of the mold space.

A problem with molding and casting is the time required to fill a mold space. To reduce the time necessary to fill a mold, the dynamic properties of fluids have been characterized and the results used to improve the processes of charging the molds, as well as the molds themselves. For instance, the interior surfaces of molds defining their corresponding mold spaces have been equipped with conductivity sensors. As the fluid fills the mold space, the conductivities measured by the sensors can be observed to drop in the case of materials having resistances less than the unfilled portion of the molds, thereby providing data on the behavior of the advancing molten front.

Meanwhile, composite materials are being utilized in an increasing number of articles of manufacture. A preform may be placed in a mold space prior to filling to generate a composite product. The use of carbon preforms is common in the production of composite parts through injection molding. One example of such a composite part is a pick up body bed for a vehicle. Such carbon preforms or mats provide the most weight saving in, for example, a car or airplane part, which in turn saves the most fuel. Carbon fiber composites save about 65% by weight over standard steel structural parts in a car. Glass fiber composites save about 35% over steel.

Molding with preforms presents a problem in that a preform in a mold space presents a physical barrier to the fluid charging the mold. This can increase the time required to fill a mold and/or result in defects such as voids in the finished product. To reduce the time necessary to fill a mold space that includes a preform, and to reduce the instance of defects, there is an ongoing need to characterize and optimize the dynamic properties of fluids in such preform containing molds. However, a serious problem with characterizing the dynamic properties of fluids in preform containing molds is that the previous approach of using conductivity sensors becomes inoperable in the case where the preform has a resistance less than the unfilled portion of the mold space. More specifically, in the manufacture of composite molded products, carbon or glass fiber preforms can be placed inside the mold space. Preforms made of carbon or glass fiber are conductive, thus rendering characterization techniques using conductivity sensors inoperative. Therefore, what is needed is an approach that solves the problem of how to characterize the dynamic front of fluid in the case of a mold space that contains a conductive preform.

An unsuccessful previous approach to solving this problem has been to recess the sensor(s) below the interior surface of the mold space. However, this approach causes wetting or surface tension problems which prevent the sensor from responding consistently. Furthermore, recessed conductive sensors require about four hours to test the filling of a mold space, and therefore they are not realistic for modeling industrial processes that need to be operated in a cost effective manner.

Heretofore, the requirements of characterizing the dynamic fluid front within a mold space containing a preform have not been fully met. What is needed is a solution that addresses this requirement.

SUMMARY OF THE INVENTION

There is a need for the following embodiments of the invention. Of course, the invention is not limited to these embodiments.

According to an embodiment of the invention, an apparatus comprises a mold defining a mold space; one or more openings for introducing a fluid into the mold space and filling the mold space with the fluid, the fluid experiencing a dynamic fluid front while filling the mold space; a plurality of heated temperature sensors extending into the mold space; and a computer coupled to the plurality of heated temperature sensors for characterizing the temporal-spatial properties of the dynamic fluid front.

According to another embodiment of the invention, a process comprises providing a mold defining a mold space and having one or more openings into the mold space; heating a plurality of temperature sensors that extend into the mold space; injecting a fluid into the mold space through the openings, the fluid experiencing a dynamic fluid front while filling the mold space with the fluid; and characterizing temporal-spatial properties of the dynamic fluid front by monitoring a temperature of each of the plurality of heated temperature sensors while the mold space is being filled with the fluid.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of an embodiment of the invention without departing from the spirit thereof, and embodiments of the invention include all such substitutions, modifications, additions and/or rearrangements.

BRIEF DESCRIPTION OF THE DRAWINGS

The drawings accompanying and forming part of this specification are included to depict certain embodiments of the invention. A clearer conception of embodiments of the invention, and of the components combinable with, and operation of systems provided with, embodiments of the invention, will become more readily apparent by referring to the exemplary, and therefore nonlimiting, embodiments illustrated in the drawings, wherein identical reference numerals (if they occur in more than one view) designate the same elements. Embodiments of the invention may be better understood by reference to one or more of these drawings in combination with the description presented herein. It should be noted that the features illustrated in the drawings are not necessarily drawn to scale.

DESCRIPTION OF PREFERRED EMBODIMENTS

Embodiments of the invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the embodiments of the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
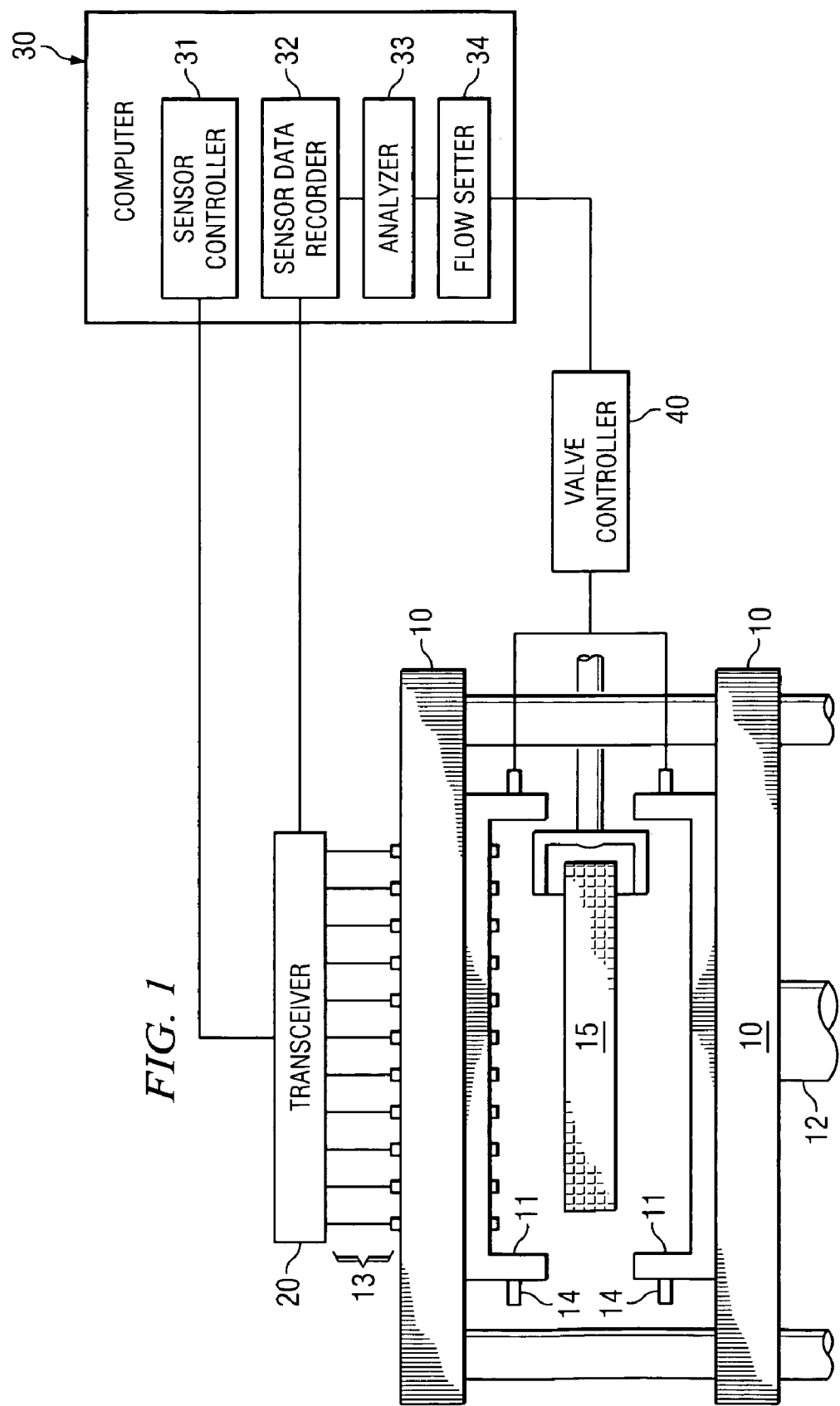
FIG. 1 is a view of an embodiment of the apparatus of the invention

Reference is first made to FIG. 1, which illustrates one specific embodiment of the invention. Shown in FIG. 1 is an injection molding apparatus. The mold (11) utilizes a hydraulic arm (12) to open and close a mold space using two press plates (10). A plurality of openings extends through the mold material into the mold space. Fluid is injected through these opening into the mold space. The fluid exhibits a dynamic fluid front while the mold space is being filled with the fluid. The diameter of the opening may be controlled through the use of constricting valves (14), thereby setting the rate at which the fluid enters the mold space through each opening. The fluid may be injected into the openings through the use of injection molding nozzles.

A plurality of sensors (13) extends through holes in the mold material into the mold space. The sensors may be arranged throughout the mold space surface in any pattern. Specifically, they may be arranged symmetrically around each of the openings, thus allowing the characterization of the dynamic fluid front of any fluid entering the mold space in all directions away from the opening. The sensors may also be uniformly distributed throughout the surface of the mold space to be able to characterize the dynamic fluid front at all locations within the mold space.

The diameter of each sensor is small enough to allow the placement of a large number of such sensors within close proximity to each other, thus providing greater definition of the fluid front as the mold fills with fluid. In one embodiment, the diameter of each sensor is 3 mm or less.

Each of the sensors is connected to a transceiver (20) which couples the sensors to a computer (30). Alternately, each of the sensors may have an individual transceiver connected to it. In one embodiment of the invention, these transceivers are wireless, thus obviating the need for a complex arrangement of wires around the mold. The computer has a wireless transceiver for receiving and sending data to the sensors in this embodiment as well. The electronic signal output from each sensor allows for computer automation of almost any injection molding process.

The computer has a first component for controlling the temperature of each sensor, for example allowing each sensor to be set to a temperature higher than the anticipated temperature of the fluid to be introduced into the mold space. This is shown in FIG. 1 as a sensor controller (31). The computer has a second component for recording data from each sensor, for example the amount of heat lost as a function of time from each of the sensors by monitoring the temperature of each sensor while the mold space is being filled with the fluid. This is shown in FIG. 1 as the sensor data recorder component of the computer (32). The computer has a third component for analyzing the data received from each sensor, for example converting data about the amount of heat lost from each sensor into data indicating the spatial position of a dynamic fluid front within the mold cavity as a function of time as the mold cavity is being filled with fluid. This component of the computer can also calculate the position of all the fluid fronts within the mold space in real time as the mold space is being filled with fluid. This is shown in FIG. 1 as the analyzer component of the computer (33).

The computer further has a fourth component for comparing the position of the fluid fronts within the mold space in real time with a pre-established desired fluid front profile as a function of time while the mold space is being filled with fluid, and for determining whether the flow of fluid into the mold space through each opening needs to be increased or decreased based on that comparison, thus setting the flow of the fluid through each opening. This is shown in FIG. 1 as the flow setter component (34). The computer includes a transmitter to transmit control signals to the constricting valves located at each opening to thereby control the flow of the fluid through each opening. This is shown in FIG. 1 as a valve controller (40). This transmitter may also be wireless. The components of the computer described above may be embodied through specific circuits, computer programs, or readily stand alone hardware.

The apparatus has a robot arm which can place preforms or mats into the mold space prior to closing the mold and injecting fluid into the mold space. Such preforms can be used to form composite products and in one embodiment of the invention are carbon fiber preforms. In another embodiment, these preforms are made of glass fiber. The fibers can be laid in multilayered mats in the mold space. In another embodiment, chopped fiber is sprayed on a wire screen, frozen in place by the sizing, which is heat set in. Just about any shape mat can be produced by this process. In one embodiment, the space within the mold space is about 50% fiber and the rest air prior to the injection of the fluid. This is indicative of composite products for an automobile application. For military aircraft composite products, the fibers are in the 79% to 90% range. The robot arm can also remove the molded product from the mold space.

Figure 2:
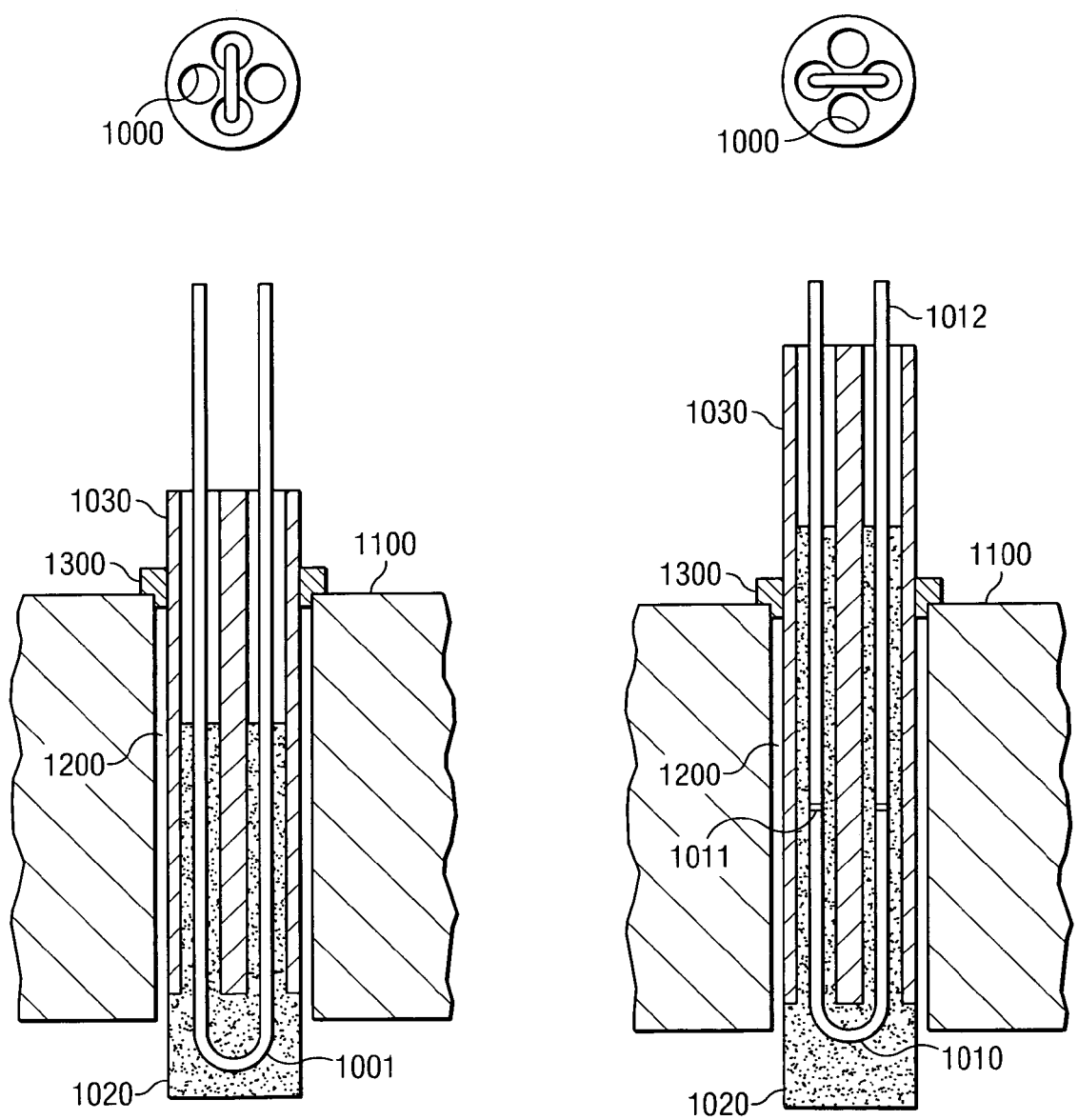
FIG. 2 is a view of an embodiment of a sensor of the apparatus of the invention

Reference will now be made to FIG. 2. FIG. 2 shows a sensor of the apparatus. The sensor has cylindrical shape with four holes (1000) extending down its length. Two of the holes house a thermocouple (1001), for a example a chromel-alumel type K thermocouple. The other two holes house a heating element (1010), for example a 0.005" nichrome heater wire. The heating element and the thermocouple extend down the length of the sensor, are parallel to each other, and are electrically isolated from each other. The nichrome heating wire may be connected to a pure nickel heater lead wire (1012) through a silver solder joint (1011). The thermocouple and the heater wire extend down the length of the cylindrical shape of the sensor, the thermocouple extending further than the heater wire at the sensor tip. The heater wire and the thermocouple are electrically isolated from each other by being encased in a structural adhesive (1020). One example of such an adhesive is the commercial available JB-Weld epoxy, which is steel filled with suspended small steel particles to enhance thermal conduction. This structural adhesive is encased in a thermally and electrically insulating tubing (1030), such as, for example, aluminum oxide. The structural adhesive has a higher thermal conductivity than the insulating tubing. This, together with the space (1200) between the sensor and the mold wall material, allow for most of the heat from the heater element to enter the mold space rather then the mold wall material.

In one preferred embodiment, to prevent heat loss from the heated sensors to the mold material, and thus ensuring most of the heat lost from the sensors occurs inside the mold space, the sensors are not bonded to the wall of the mold material (1100) except at the outside surface of the mold. This bond (1300) at the outside surface of the mold forms a seal between the mold material and a sensor, and this seal is sufficiently far away from the tip of the sensor inside the mold space to prevent significant transfer of heat from the heated sensor tip to the material of the mold wall. There is a close fit between the sensor and the hole through the mold wall through which the sensor passes. Thus a small space (1200) exists all around each sensor as it passes through the mold wall. This space is sufficiently narrow to prevent fluid from the mold space from entering it.

A method for fabricating one embodiment of such a sensor will now be described. The insulating tube is cut from a raw stock of aluminum oxide having an outer diameter of ⅛" to a length of 2¾". The tube is checked for straightness. A groove is cut at the sensor end of the tube to provide a recess for the heater wire to keep it sufficiently distant from the thermocouple to prevent a short from occurring. The 0.005" diameter nichrome wire is bonded to a pure nickel 0.020" lead wire through a silver solder process. The wire is cleaned with acetone or alcohol, MicroMeasurements Group Preparation-A, and then Neutralizer. The heater wire is inserted into the insulating tube, followed by the chromel-alumel type K thermocouple wires. The thermocouple wires are stripped of insulation at the sensor tip and are arc welded together. Once it is ensured that both the heater wire and thermocouple wires are taut and not in contact with each other, the JB-Weld epoxy is injected into the insulating tube. The sensor is checked for shorts and continuity. Teflon insulation is then slipped over the heater leads. A close fitting hole is machined through the mold wall and the sensor is inserted into the hole without bonding it to the mold wall. A bonding seal between the sensor and the mold wall is applied only at the outer surface of the mold where the sensor exits the mold wall. Finally, a transceiver is attached to the sensor to allow it to communicate with the computer.

The particular materials selected for the components of the sensor are not essential to an embodiment of the invention, as long as they provide the described function. Normally, those who make or use an embodiment of the invention will select the best commercially available materials based upon the economics of cost and availability, the expected application requirements of the final product, and the demands of the overall manufacturing process.

Figure 3A:
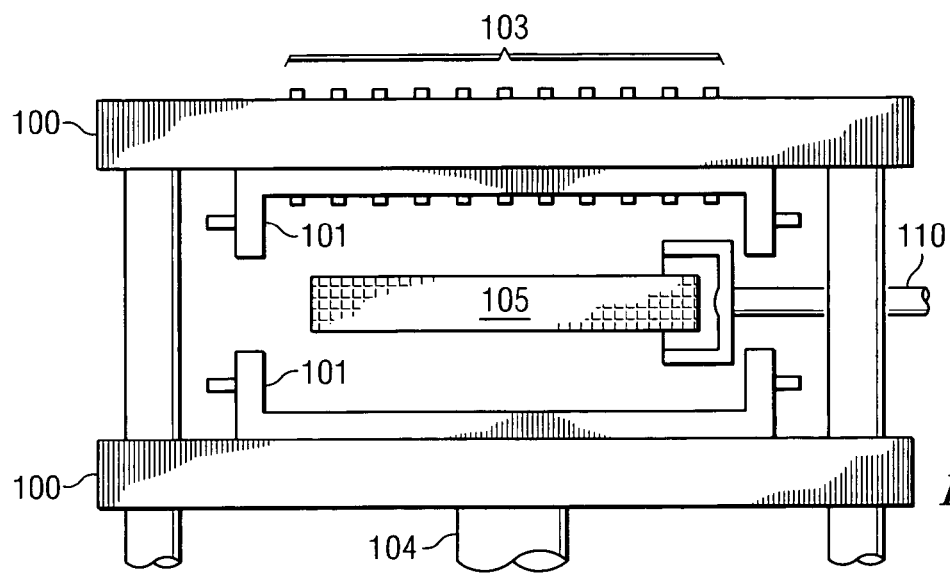
FIGS. 3A-3E show the apparatus during various steps of the method of the invention
Figure 3B:
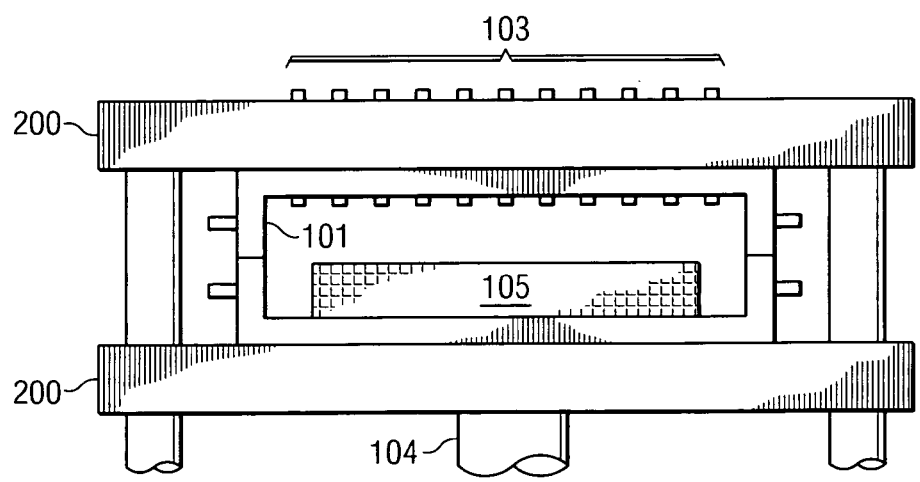
Figure 3C:
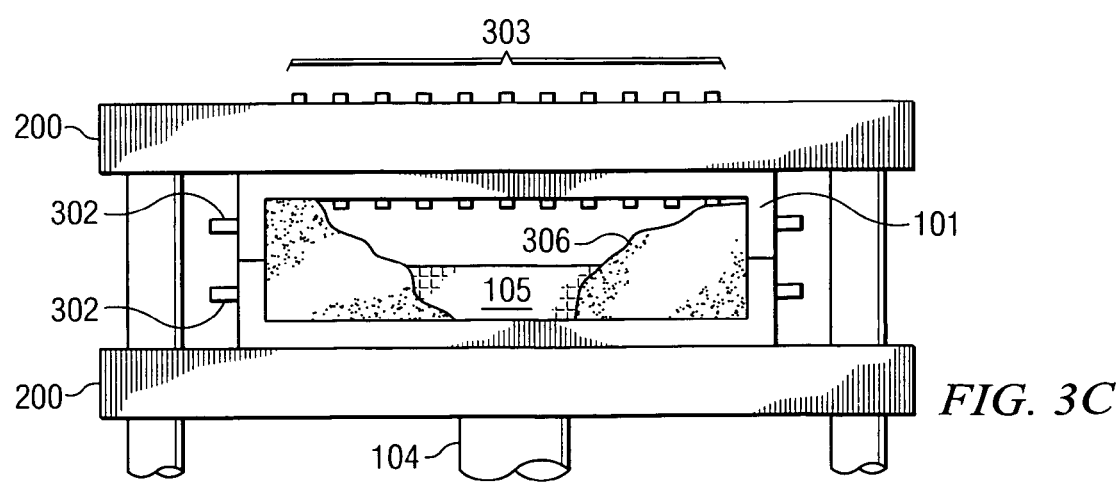
Figure 3D:
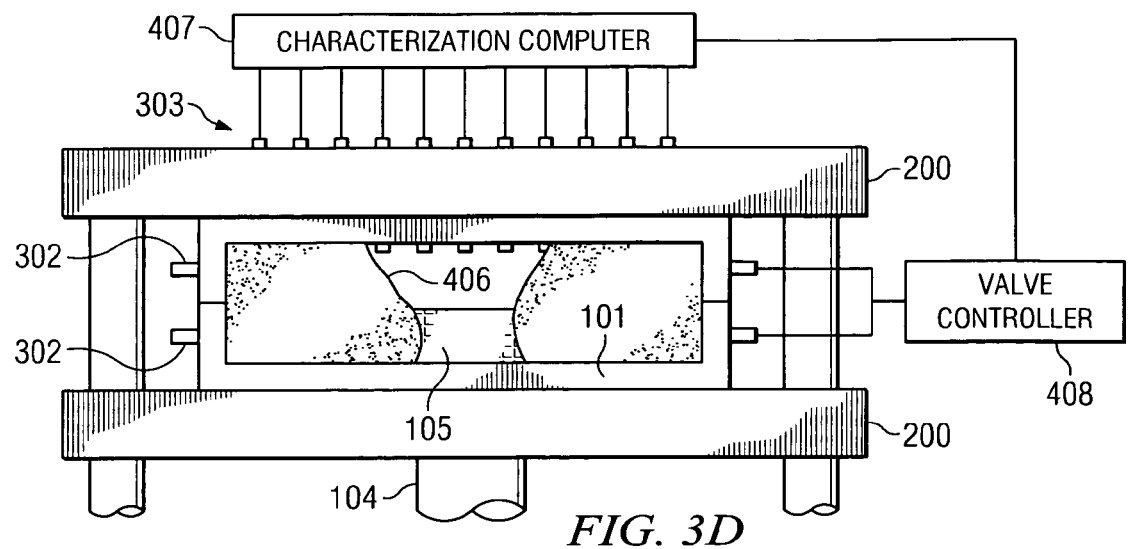

Reference will now be made to FIGS. 3A-3E, which shows the process steps of an embodiment of the method of the invention. FIG. 3A shows the mold (101) between press plates (100) operated by a hydraulic arm (104). The press plates are moved apart to open the mold and allow access to the mold space. A robotic arm (110) places a preform (105), such as a carbon fiber preform, into the mold space. The sensors (103) are heated to a temperature higher than the anticipated fluid temperature. The press plates (200) are then moved together to close the mold space, as shown in FIG. 3B. In the next step, shown in FIG. 3C, fluid (306) is introduced into mold space through the openings (302), the fluid having a dynamic fluid front. Wherever the fluid contacts the heated sensors (303) within the mold space, heat will flow from the tip of the sensor into the fluid. The amount of heat from each sensor is negligible compared to the thermal mass of the fluid, therefore the temperature of the fluid will not change. As the heat flows from the sensor to the fluid, the sensor experiences a drop in temperature. This data is sent to the characterization computer (407), shown in FIG. 3D. This data records the amount of heat lost as a function of time from each of the sensors in real time as the fluid begins to enter the mold space and this process is continued until the mold space is filled with fluid. The computer then converts this heat loss data into data indicating the spatial position of the dynamic fluid front within the mold cavity as a function of time.

Figure 3E:
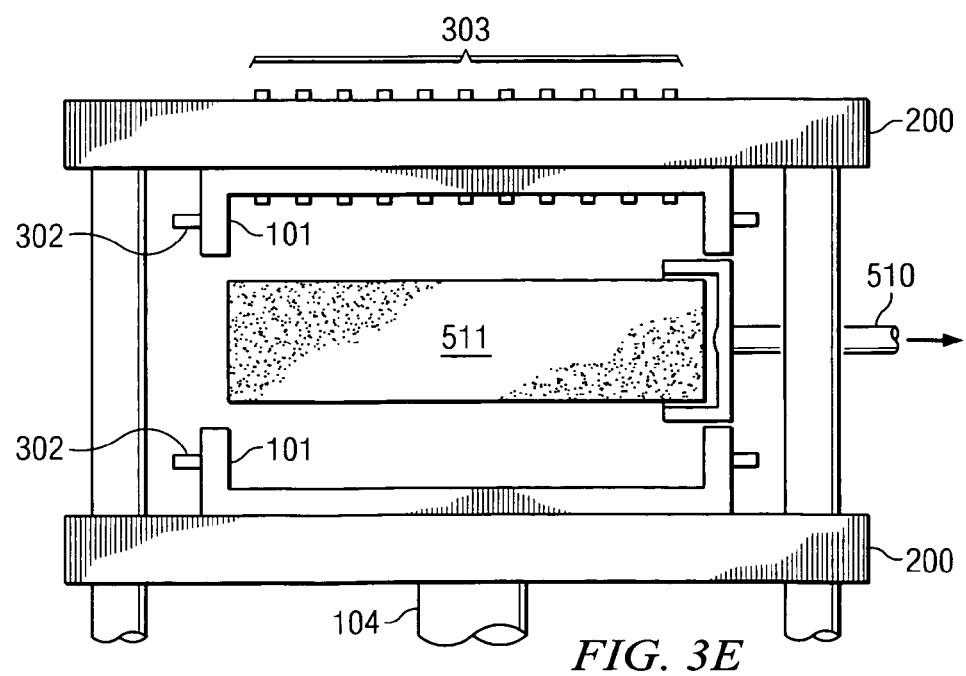

In one embodiment of the invention, the data is simply collected to characterize the temporal-spatial properties of the dynamic fluid front as the mold space is being filled with fluid. This information can be used to determine how fast a given mold can be filled with a given fluid. Determining how fast a given mold fills allows for calculating whether a molding process is cost effective in a given production line In another embodiment, as a first step, this data is compared with a pre-established desired fluid front profile as a function of time while the mold space is being filled with fluid in real time, and the computer (407), as a second step, determines whether the flow of fluid into the mold space through each opening needs to be increased or decreased based on that comparison. The computer, as a third step, then transmits a control signal to the constricting valves located at each opening to thereby control (408) the flow of the fluid through each opening, as shown in FIG. 4D. These first through third steps are continuously repeated until the mold space is filled with fluid. The mold space is thus filled with fluid (406) which exhibits the desired fluid front profile during the filling of the mold space. Finally, as shown in FIG. 3E, after the fluid is allowed to cool and solidify, a robotic arm (510) removes the finished product (511) from the mold space.

In one embodiment of this process, a sensor, consisting of a thermocouple; a heater wire running parallel to the thermocouple, and electrically isolated from the thermocouple; an electrically insulating structural adhesive encasing both the thermocouple and the heater wire; an electrical and thermal insulator tube encasing the structural adhesive; wherein the thermal conductivity of the structural adhesive is higher than the thermal conductivity of the thermal insulator tube; and wherein the sensor is bonded to the mold through which it passes only at the outside mold surface, thereby creating a space between the mold and the thermal insulator tube, is used.

An embodiment of the invention can also be included in a kit-of-parts. The kit-of-parts can include some, or all, of the components that an embodiment of the invention includes. The kit-of-parts can be an in-the-field retrofit kit-of-parts to improve existing systems that are capable of incorporating an embodiment of the invention. The kit-ofparts can include software, firmware and/or hardware for carrying out an embodiment of the invention. The kit-of-parts can also contain instructions for practicing an embodiment of the invention. Unless otherwise specified, the components, software, firmware, hardware and/or instructions of the kit-of-parts can be the same as those used in an embodiment of the invention.

Definitions

The term program and/or the phrase computer program are intended to mean a sequence of instructions designed for execution on a computer system (e.g., a program and/or computer program, may include a subroutine, a function, a procedure, an object method, an object implementation, an executable application, an applet, a servlet, a source code, an object code, a shared library/dynamic load library and/or other sequence of instructions designed for execution on a computer or computer system).

The term substantially is intended to mean largely but not necessarily wholly that which is specified. The term approximately is intended to mean at least close to a given value (e.g., within 10% of). The term generally is intended to mean at least approaching a given state. The term coupled is intended to mean connected, although not necessarily directly, and not necessarily mechanically. The term proximate, as used herein, is intended to mean close, near adjacent and/or coincident; and includes spatial situations where specified functions and/or results (if any) can be carried out and/or achieved. The term deploying is intended to mean designing, building, shipping, installing and/or operating.

The terms first or one, and the phrases at least a first or at least one, are intended to mean the singular or the plural unless it is clear from the intrinsic text of this document that it is meant otherwise. The terms second or another, and the phrases at least a second or at least another, are intended to mean the singular or the plural unless it is clear from the intrinsic text of this document that it is meant otherwise. Unless expressly stated to the contrary in the intrinsic text of this document, the term or is intended to mean an inclusive or and not an exclusive or. Specifically, a condition A or B is satisfied by any one of the following: A is true (or present) and B is false (or not present), A is false (or not present) and B is true (or present), and both A and B are true (or present). The terms a or an are employed for grammatical style and merely for convenience.

The term plurality is intended to mean two or more than two. The term any is intended to mean all applicable members of a set or at least a subset of all applicable members of the set. The phrase any integer derivable therein is intended to mean an integer between the corresponding numbers recited in the specification. The phrase any range derivable therein is intended to mean any range within such corresponding numbers. The term means, when followed by the term "for" is intended to mean hardware, firmware and/or software for achieving a result. The term step, when followed by the term "for" is intended to mean a (sub)method, (sub)process and/or (sub)routine for achieving the recited result.

The terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. The terms "consisting" (consists, consisted) and/or "composing" (composes, composed) are intended to mean closed language that does not leave the recited method, apparatus or composition to the inclusion of procedures, structure(s) and/or ingredient(s) other than those recited except for ancillaries, adjuncts and/or impurities ordinarily associated therewith. The recital of the term "essentially" along with the term "consisting" (consists, consisted) and/or "composing" (composes, composed), is intended to mean modified close language that leaves the recited method, apparatus and/or composition open only for the inclusion of unspecified procedure(s), structure(s) and/or ingredient(s) which do not materially affect the basic novel characteristics of the recited method, apparatus and/or composition.

Unless otherwise defined, all technical and scientific terms used herein have the same meaning as commonly understood by one of ordinary skill in the art to which this invention belongs. In case of conflict, the present specification, including definitions, will control.

Conclusion

The described embodiments and examples are illustrative only and not intended to be limiting. Although embodiments of the invention can be implemented separately, embodiments of the invention may be integrated into the system(s) with which they are associated. All the embodiments of the invention disclosed herein can be made and used without undue experimentation in light of the disclosure. Although the best mode of the invention contemplated by the inventor(s) is disclosed, embodiments of the invention are not limited thereto. Embodiments of the invention are not limited by theoretical statements (if any) recited herein. The individual steps of embodiments of the invention need not be preformed in the disclosed manner, or combined in the disclosed sequences, but may be preformed in any and all manner and/or combined in any and all sequences. The individual components of embodiments of the invention need not be formed in the disclosed shapes, or combined in the disclosed configurations, but could be provided in any and all shapes, and/or combined in any and all configurations. The individual components need not be fabricated from the disclosed materials, but could be fabricated from any and all suitable materials.

It can be appreciated by those of ordinary skill in the art to which embodiments of the invention pertain that various substitutions, modifications, additions and/or rearrangements of the features of embodiments of the invention may be made without deviating from the spirit and/or scope of the underlying inventive concept. All the disclosed elements and features of each disclosed embodiment can be combined with, or substituted for, the disclosed elements and features of every other disclosed embodiment except where such elements or features are mutually exclusive. The spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. An apparatus, comprising:
a mold defining a mold space;
one or more openings for introducing a fluid into the mold space and filling the mold space with the fluid, the fluid experiencing a dynamic fluid front while filling the mold space;
a plurality of heated temperature sensors extending into the mold space; and
a computer coupled to the plurality of heated temperature sensors for characterizing the temporal-spatial properties of the dynamic fluid front, wherein each of the plurality of heated temperature sensors includes a wireless transceiver.

2. An apparatus, comprising:
a mold defining a mold space;
one or more openings for introducing a fluid into the mold space and filling the mold space with the fluid, the fluid experiencing a dynamic fluid front while filling the mold space;
a plurality of heated temperature sensors extending into the mold space; and
a computer coupled to the plurality of heated temperature sensors for characterizing the temporal-spatial properties of the dynamic fluid front, wherein an arrangement of the plurality of sensors is substantially symmetric around each of the one or more openings.

3. An apparatus, comprising:
a mold defining a mold space;
one or more openings for introducing a fluid into the mold space and filling the mold space with the fluid, the fluid experiencing a dynamic fluid front while filling the mold space;
a plurality of heated temperature sensors extending into the mold space; and
a computer coupled to the plurality of heated temperature sensors for characterizing the temporal-spatial properties of the dynamic fluid front, wherein an arrangement of the plurality of sensors is substantially uniformly distributed across at least one wall defined by the mold space.

4. An apparatus, comprising:
a mold defining a mold space;
one or more openings for introducing a fluid into the mold space and filling the mold space with the fluid, the fluid experiencing a dynamic fluid front while filling the mold space;
a plurality of heated temperature sensors extending into the mold space; and
a computer coupled to the plurality of heated temperature sensors for characterizing the temporal-spatial properties of the dynamic fluid front, wherein the computer comprises:
a controller component to set a temperature of each of the sensors higher than an anticipated temperature of the fluid;
a data acquisition component to record, as heat loss data, an amount of heat lost as a function of time from each of the plurality of heated temperature sensors by monitoring a temperature of each of the plurality of heated temperature sensors while the mold space is being filled with the fluid; and
a data processing component to convert the heat loss data into data indicating the spatial position of the dynamic fluid front within the mold cavity as a function of time.

5. The apparatus of claim 4, further comprising:
a logic component to compare a position of the dynamic fluid front within the mold space in real time with a pre-established desired fluid front profile as a function of time while the mold space is being filled with the fluid, and for determining whether a flow of the fluid into the mold space through each of the one or more openings needs to be increased or decreased based on that comparison;
a constricting valve coupled to each of the one or more openings for controlling a conductance of each of the one or more openings; and
a transmitter coupled to the computer to transmit control signals to the constricting valves to control the flow of the fluid through each of the one or more openings.

6. An apparatus for characterizing the temporal-spatial characteristics of a dynamic fluid front, comprising:
a mold defining a mold space;
one or more openings for introducing fluid into the mold space and filling the mold space with the fluid, the fluid experiencing a dynamic fluid front while filling the mold space:
a robotic arm for placing preforms within the mold space;
a plurality of sensors, each of which comprises:
a thermocouple;
a heater wire running parallel to the thermocouple, and electrically isolated from the thermocouple;
an electrically insulating structural adhesive encasing both the thermocouple and the heater wire;
an electrical and thermal insulator tube encasing the structural adhesive;
wherein the thermal conductivity of the structural adhesive is higher than the thermal conductivity of the thermal insulator tube and
wherein the sensor is bonded to the mold through which it passes only at the outside mold surface, creating a space between the mold and the thermal insulator tube;
a computer coupled to the plurality of heated temperature sensors, the computer including:
a controller component to set a temperature of each of the sensors higher than an anticipated temperature of the fluid;
a data acquisition component to record, as heat loss data, an amount of heat lost as a function of time from each of the plurality of heated temperature sensors by monitoring a temperature of each of the plurality of heated temperature sensors while the mold space is being filled with the fluid;
a data processing component to convert the heat loss data into data indicating a spatial position of the dynamic fluid front within the mold cavity as a function of time;
a logic component to compare the spatial position of the dynamic fluid front within the mold space in real time with a pre-established desired fluid front profile as a function of time while the mold space is being filled with fluid, and for determining whether a flow of the fluid into the mold space through each of the one or more openings needs to be increased or decreased based on that comparison;
a constricting valve coupled to each of the one or more openings for controlling a conductance of each of the one or more openings; and
and a transmitter coupled to the computer to transmit control signals to the constricting valve to control the flow of the fluid through each of the one or more openings.

* * * * *